Figure 1:
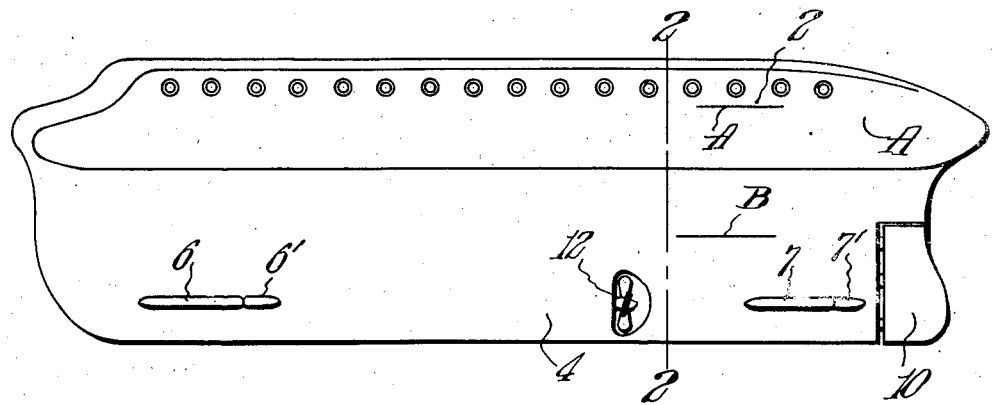

Aug. 22, 1944.   H. PERSSON   2,356,349
BOAT
Filed April 12, 1943

INVENTOR.
BY Henry Persson.

Patented Aug. 22, 1944

2,356,349

UNITED STATES PATENT OFFICE 2,356,349

BOAT

Henry Persson, Bloomfield, N. J., assignor to H. S. P. Marine Inc., Bloomfield, N. J., a corporation of Delaware Application April 12, 1943, Serial No. 482,685

4 Claims. (Cl. 114—66.5)

This invention relates to improvements in boats and is directed more particularly to improvements in power driven boats.

The principal objects of the invention are directed to the provision of a boat constructed and arranged for high speed operation or such speeds as are ordinary with aircraft. The construction of ordinary boats and ships is such that the hull floats on and displaces water which obviously limits the speed thereof.

According to this invention, the construction is such that the hull or body rests on and displaces water only when the ship is motionless yet when the ship is being propelled the hull or body is lifted or elevated above the water leaving only such parts in the water as do not appreciably impede speed. At the same time, the lifting means assists in the stability and maneuverability of the boat thus enhancing the extreme high speeds desired.

The novel objects of the invention are accomplished in a broad way by the provision of a hull having a relatively small height or vertical dimension with relation to that of its beam and length in combination with spaced longitudinally extending depending keels of considerable depth which are carried by the hull and that have horizontally extending wings or planes provided with rear swingable sections.

The construction and proportions will preferably be arranged so that when the ship is in motion the planes or wings with their movable sections operate on the water to lift the ship and thereby elevate the hull above the crest of the waves while the planes or wings themselves are disposed at a distance below the water. The hull being thus elevated above the water and the keels and planes or wings only being in the water displacement of the hull is eliminated whereby much greater speeds may be attained with much less power than where the hull of the ordinary ship is supported by and displaces water.

Great speed is desired for many reasons but is unobtainable with present day boats. Rapid transportation is not only desired but should a submarine torpedo be successfully aimed to contact the fast moving ship little if any damage would result since the hull is above the water so that the torpedo would pass through the keels.

The ship may be constructed in any size desired, and while the inventions are thus adapted for broad application it will be possible to provide the much desired extremely fast cargo, troop, and fighting ships, plane carriers and the like.

With plane carriers speeds may be attained that approach or even exceed that of take-off and landing speeds of planes thus facilitating their ready and quick take-off and landing operations without effecting or slowing down of the ship.

The high speeds possible by the ship of the invention are many times faster than is possible with present day ships and vessels and is accomplished by the novel construction. Experiments with models in tanks of water have clearly demonstrated that the hull of the boat, even when propelled at no more than fifteen or twenty miles an hour, is elevated above the water so as to overcome and eliminate to great extent the speed limiting factors in connection with ordinary boats such as water resistance.

Figure 2:
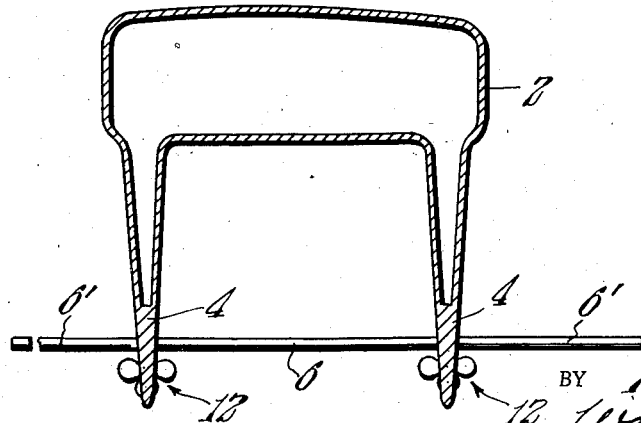

Various novel features and advantages of the invention will be observed from the following description thereof as illustrated in the drawing wherein:

Fig. 1 is a diagrammatic side elevational view of a ship embodying the novel features of the invention; and Fig. 2 is a sectional elevational view on the line 2—2 of Fig. 1 at a somewhat larger scale.

Referring now to the drawing more in detail, the invention will be more fully described.

The ship of the invention includes a hull 2 having longitudinal spaced depending keel members such as 4. The shape and size of the hull and keels and the relative proportions thereof may be varied within wide limits and constructed from various materials.

The hull may be designed for cargo and passengers and its general construction including the top side may be arranged for plane carrying and landing purposes.

Horizontally disposed wings or planes 6 and 7 are carried by the keels 4. In the drawing, such planes are fore and aft on the keels and in some cases where desired and necessary there may be other intermediate similar planes.

These planes have rear sections 6' and 7' which are hinged to the rear edges of the planes for swinging movements up and down relative to the horizontal main bodies of the planes.

Rudders 10 are pivoted to rear end portions of the keel members and propellers such as 12 are carried by suitable rotatable shafts, not shown. Said shafts or the propellers may be driven by any suitable power means. For instance, in a large ship driving units may be disposed in the keel somewhat adjacent to the propellers and said units may be arranged for independent operation. Or the propellers may be mechanically or electrically operated from a central power plant or plants. It will be desired in every case that the propellers and their power units provide the desired and necessary propulsion of the craft to attain the speeds desired.

The rear sections 6' of the wings 6 may be arranged and constructed to function with or supplementary to the rudders 10 for steering the ship and their operation may if desired be under the control of the rudder actuating means which may take any desired well known form.

The rear wing sections 7' may be moved up and down by any suitable operating mechanisms and independently or simultaneously, all as may be desired.

When the ship is at rest, the hull 2 settles in the water so that the water line will be in the proximity of the line A.

When the ship is propelled by the propellers the wing sections 7' are adjusted so that the action of the wings on the water is to lift the ship or elevate it to the extent the hull is free of the water and preferably at such a distance therefrom that its underside is free of the waves. The water line then may be at or about the line B.

The horizontal expanse of the wings and their movable sections will be so proportioned relative to the ship and the propulsion means as to accomplish this and therefore the hull being free of the water it is possible to attain the extreme speeds for which the ship is intended.

There may be a plurality of propellers spaced along each keel if desired, in order to provide the desired and necessary propelling power which will depend on the proportions of the ship and speed thereof to be obtained.

The keels, of course, enhance stability to obviate rolling and the hull being free of the water pitching and tossing is substantially if not entirely eliminated. It is intended that the planes be so located so as to remain below the water at a distance of some feet so as to not be subject to the action of the water at the surface and thereby act on the water and maintain the elevation of the hull while the ship is propelled.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A ship comprising in combination, a hull, transversely spaced longitudinally extending vertical keels depending thererfom, planes forward and aft of the ship horizontally disposed and carried by the keels having trailing rear portions hinged to the rear portions of the planes for swinging up and down, propellers carried by the keels, and rudders hinged to the rear ends of said keels.

2. A ship comprising in combination, a hull, transversely spaced longitudinally extending vertical keels depending therefrom, planes forward and aft of the ship horizontally disposed and carried by the keels having trailing rear portions hinged to the rear portions of the planes for swinging up and down, propellers carried by the keels, and rudders hinged to the rear ends of said keels, said hull having a relatively less vertical height dimension than length dimension.

3. A ship comprising in combination, a hull, transversely spaced longitudinally extending vertical keels depending therefrom, planes forward and aft of the ship horizontally disposed and carried by the keels having trailing rear portions hinged to the rear portions of the planes for swinging up and down, propellers carried by the keels, and rudders hinged to the rear ends of said keels, said hull having a relatively less vertical height dimension than length dimension, said planes being disposed vertically of said keels so as to underlie the surface of the water when the boat is in motion thereby to act on the water for lifting the hull upwardly relative to the water.

4. A ship comprising in combination, a hull, transversely spaced longitudinally extending keels depending therefrom, planes forward and aft of the ship horizontally disposed extending between the keels and projecting outwardly from the outer sides thereof, propellers carried by the keels, and rudders hinged to the rear ends of said keels, said planes having portions hinged to an edge thereof for swinging movements.

HENRY PERSSON.